United States Patent [19]  
McHale et al.

[11] Patent Number: 4,592,240  
[45] Date of Patent: Jun. 3, 1986

[54] ELECTRICAL-CHARGE SENSING FLOWMETER

[75] Inventors: Edward J. McHale, Medfield; Wade M. Mattar, Wrentham, both of Mass.

[73] Assignee: The Foxboro Company, Foxboro, Mass.

[21] Appl. No.: 539,769

[22] Filed: Oct. 7, 1983

[51] Int. Cl.⁴ .............................................. G01F 1/32
[52] U.S. Cl. .............................. 73/861.22; 73/861.09; 324/453
[58] Field of Search ........... 73/861.21, 861.22, 861.32, 73/861.34, 861.08, 861.09; 324/453

[56] References Cited  
U.S. PATENT DOCUMENTS  
2,491,445 12/1949 Cunningham et al. ........... 73/861.09  
3,478,261 11/1969 Forster et al. ................ 73/861.08 X  
4,363,244 12/1982 Rabeh et al. ...................... 73/861.08

FOREIGN PATENT DOCUMENTS  
2073426 10/1981 United Kingdom ............. 73/861.09

Primary Examiner—Charles A. Ruehl  
Attorney, Agent, or Firm—J. H. Wu; T. Martin; W. E. Meyer

[57] ABSTRACT

An element interacting with a stream of a fluid moving through a pipe generates periodic sub-flows at a rate that varies in accordance with changes in the velocity of the moving fluid. The generation of sub-flows also modulates the electrical charges contained in and moving with the fluid thus permitting a detector which is responsive to the energy being radiated by the modulated charges to produce a sensor signal having a frequency corresponding to the generating rate of the periodically produced sub-flows. In one preferred embodiment, the element is a vortex-shedding body and the sub-flows are vortices being shed therefrom. Electrical circuitry which receives the sensor signal converts it into a flow signal representative of the velocity of the moving fluid.

19 Claims, 11 Drawing Figures

ELECTRICAL-CHARGE SENSING FLOWMETER

BACKGROUND OF THE INVENTION

1. Field of the Invention

This invention relates generally to devices for measuring the flow rate of a fluid moving through a conduit, and more particularly to a flowmeter of the type which disturbs the flow stream for producing modulated sub-flows and includes a sensor for responding to the electrical activity generated by the sub-flows.

2. Description of the Prior Art

It is known that a fluid moving in a conduit against around various obstructions such as valves and bends of elbows generates electrical activity within the fluid. In U.S. Pat. No. 4,363,244 issued to Rabeh and Hemp a flowmeter is disclosed which is sensitive to such electrical activity. Rabeh and Hemp teach that this electrical activity is believed to be the result of electrical charges in the fluid. Therefore, as the fluid containing these electrical charges moves through the conduit, a noise signal is produced which can be detected by a series of electrodes disposed along the fluid flow stream. One aspect of the invention disclosed in the '244 patent is that the mean frequency of the received noise signal is taught to be proportional to the flow rate of the fluid.

However, the electrical charges are thought to be irregularly distributed in the fluid so that the received signal includes many randomly occurring peaks and is not a well-defined, smoothly changing signal that is easily detected and processed. Statistical methods are thus necessary for calculating the fluid flow rate. Since the peaks of the received signal are widely scattered over time, the accuracy of any short term calculation of the flow rate will be degraded. Accordingly, it appears that the patent discloses a relatively slow reacting device.

Moreover, the '244 patent teaches the use of circuits which square, integrate, divide and determine the square root of various parts of the received noise signal. Though such circuits are well known, they become more complex and costly as greater precision is required.

U.S. Pat. No. 3,813,939 issued to Head discloses another flowmeter responsive to electrical charges contained in a moving fluid. The Head patent teaches that a pair of electrodes disposed in a pipe are usable for sensing the field signal generated by the movement of the fluid containing the charges. Being separated by a known distance, the two electrodes produce signals which are amplified and algebraically combined with one another to yield a difference signal. By applying this difference signal to an auto-correlator, the transit time of the electrical charges can be determined and the fluid flow rate can be thus calculated therefrom. However, it is admitted in the '939 patent that the invention described therein is suitable only for applications where relatively low accuracy and slow response are acceptable, such as where an alarm or safety valve is actuated in response to a gross change in flow rate. In other words, since the flowmeter disclosed by Head is still based on a statistical procedure, it suffers from the same drawbacks as previously mentioned for the device mentioned in the '244 patent.

As a result of the above, the flowmeters disclosed in the '244 and '939 patents are generally not suitable for industrial process applications. Therefore, there is a need for an improved flowmeter which performs relatively quickly and accurately when responding to the electrical activity produced by fluid moving through a pipe.

SUMMARY OF THE INVENTION

The problem and limitations mentioned above for prior art flowmeters used for sensing electrical signals from moving fluids are overcome by the present invention wherein a modulating element periodically diverts (or influences) a portion of the fluid flow into sub-flows. It should be explained that a sub-flow as used herein refers to any perturbation of the flow profile which would have existed if the disturbing element (or influence) of the present invention was not present. The modulating element is arranged to produce the sub-flows at a generating frequency that is proportional to the flow velocity of the moving fluid. The sub-flows induce an electrical signal in a sensor. Having a distinct and characteristic frequency equal to the generating frequency of the sub-flows, the electrical signal is therefore representative of the flow velocity of the moving fluid. This arrangement permits the signal detecting and processing circuitry to be simpler than the previously mentioned circuits since the characteristic frequency of the electrical signal of the present invention is easier to detect than calculating the mean frequency of a signal having a broad spectral distribution.

In one preferred embodiment of the present invention, a conventional vortex-shedding body is placed in the fluid flow stream for producing sub-flows in the form of vortices. The sensor includes two electrodes and a high input impedance differential amplifier that is connected to the two electrodes for sensing the voltage induced therein by the vortex-shedding process. The signal produced by the amplifier has a power spectral density with a dominant frequency peak that corresponds to the generating rate of the vortices. Being approximately a sinewave with a frequency equal to the vortex shedding frequency, the amplifier signal is thus usable as a measure of the fluid flow velocity.

Being sharply defined, the frequency peak is easily detected without resorting to the use of statistical methods. Applicant's invention is therefore suited for most industrial process applications since it can be made to respond quickly and measure accurately over a wide range of flow rates. Having no moving parts, the present invention can also be made to be very rugged for withstanding harsh environments. Moreover, the electrodes can be passive so that no external power source is necessary for operating the electrodes or inducing the flow signal therein.

Other aspects and advantages of the present invention will be more apparent from a reading of the ensuing written description given with reference to the appended drawings.

DETAILED DESCRIPTION OF THE PREFERRED EMBODIMENTS

Figure 1A:
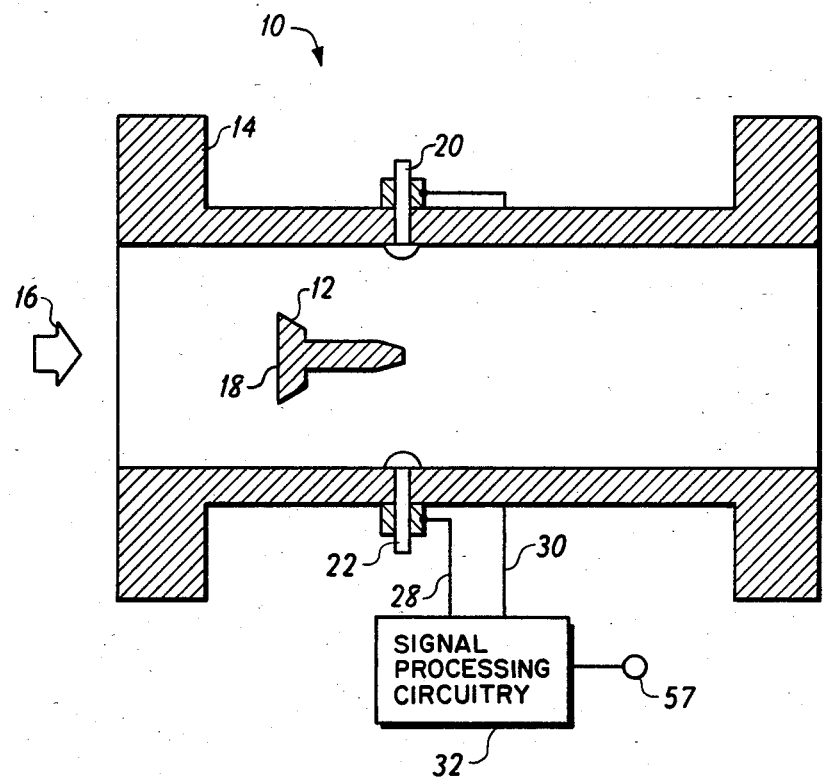
FIG. 1A depicts a sectional view of a flowmeter made in accordance with the teachings of the present invention wherein sensing electrodes contact a fluid moving through a pipe made of an electrically insulative material.

Depicted in FIG. 1A is a sectional view of a flowmeter 10 made in accordance with the teachings of the present invention. A conventional vortex-shedding body 12 is mounted (by means not shown) in an insulating pipe 14 which has a fluid passing therethrough in a direction denoted by an arrow 16. As is well known, when the fluid passes around the non-streamlined face of an upstream surface 18, the portion of the fluid stream adjacent the body 12 cannot follow the sharp contour of the surface 18 and thus separates from the body to form a shear layer. Having a large velocity gradient therein, this shear layer is inherently unstable and thereby breaks down after some length of travel into well-defined vortices, that are also known as Karman vortices. The vortices are rotational flow zones which form alternately on each side of the surface 18. It should be understood that the generating rate (frequency) of the vortices changes in accordance with variations in the flow rate of the moving fluid.

Figure 1B:
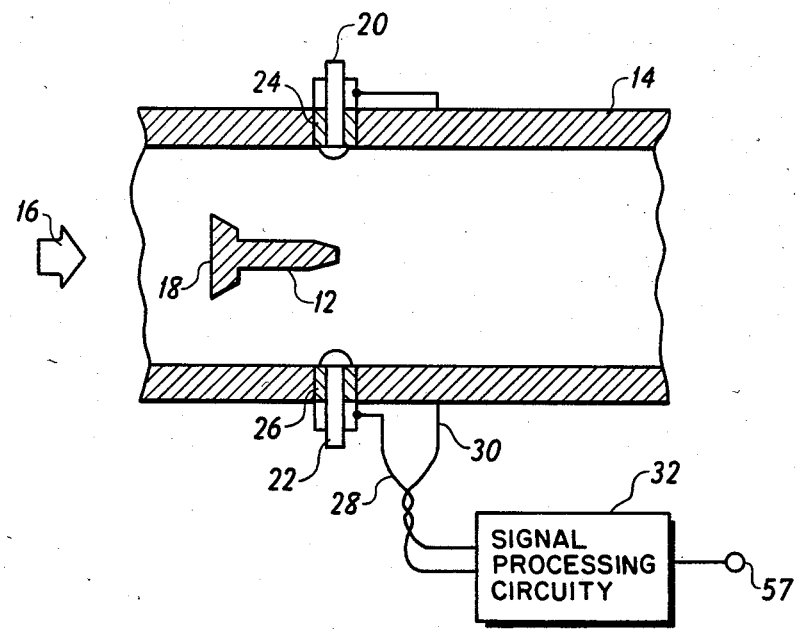
FIG. 1B shows the flowmeter of FIG. 1A adapted for use with a pipe made of electrically conductive material.

A pair of button-type electrodes 20, 22 are mounted to the pipe and extend through the sidewalls thereof. The electrodes have a button-shaped surface for contacting the moving fluid and receiving a signal generated by each vortex. Pipe 14 is typically made of an electrically insulative material. However, as depicted in FIG. 1B, if the pipe 14 were made of an electrically conductive material such as a metal, the electrodes 20 and 22 must be insulated from the pipe so that the signals picked up by the electrodes are not shorted to the pipe walls and thereby lost. Accordingly, as depicted in FIG. 1B a pair of insulators 24, 26 are used to isolate the electrodes 20, 22 respectively from the pipe 14.

Returning to FIG. 1A, shown therein are two electrical leads 28, 30 which connect the electrodes 20, 22 respectively to an input of signal processing circuitry 32 which will be described in more detail in a subsequent portion of this description. It should be understood that the charges which exist in the moving fluid also exist in the vortices. The movement of any of the electrical charges generates a change in the associated electric field so that as each vortex moves downstream, a voltage change is induced in the electrodes. Since the generating frequency of the vortices is proportional to the rate of flow of the moving fluid, the voltage signal induced in the electrodes 20, 22 by the vortices has a specific and distinct frequency that is the same as the generating frequency of the vortices.

Figure 2:
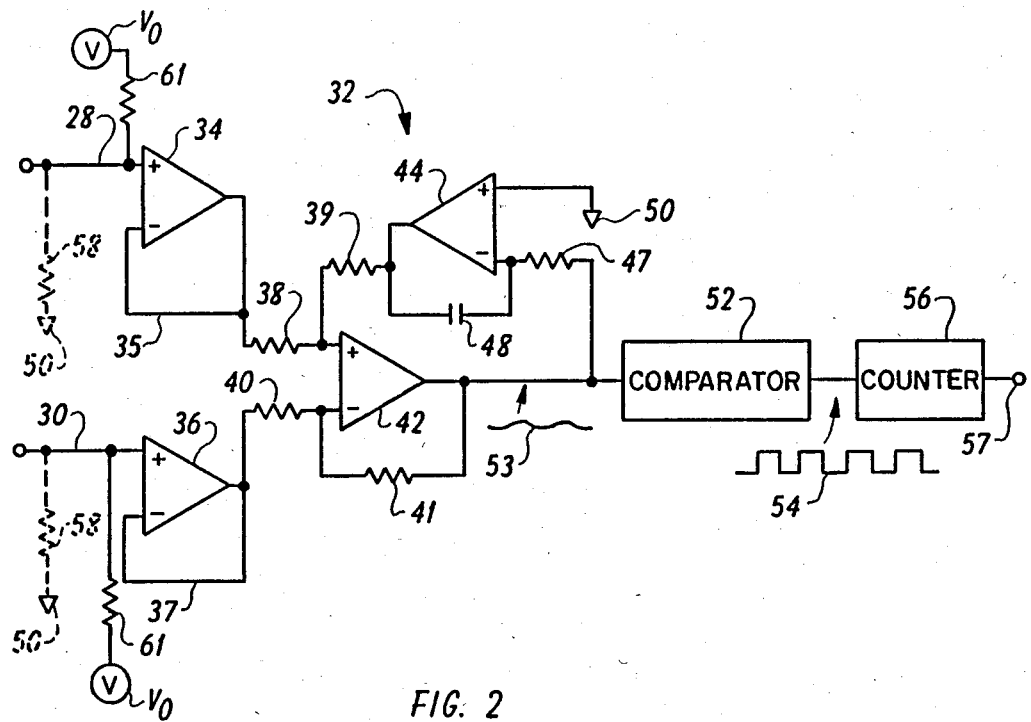
FIG. 2 depicts an electrical schematic of processing circuitry for sensing voltage signals.

A circuit 32A suitable for detecting the voltage signal induced in the electrodes 20, 22 is depicted in FIG. 2. The electrical leads 28, 30 are connected respectively to the non-inverting inputs (designated with the symbol +) of operational amplifiers 34, 36. A circuit lead 35 connects the inverting input (designated by the symbol −) of the operational amplifier 34 to the output thereof. Similarly, a circuit lead 37 connects the inverting input of the operational amplifier 36 to its output stage. These two operational amplifiers serve as high-impedance buffers. The outputs of these two operational amplifiers are then connected to resistors 38 and 40 respectively. The other sides of these two resistors are coupled respectively to the non-inverting and inverting inputs of an operational amplifier 42 which serves as a unity gain differential amplifier. A resistor 41 connects the inverting input of the operational amplifier 42 to its output stage. This output stage is also connected to one end of a resistor 47. The other end of this resistor is applied to the inverting input of an operational amplifier 44. A capacitor 48 connects the inverting input of the operational amplifier 44 to its output stage. The non-inverting input of the amplifier 44 is connected to a ground 50. A resistor 39 connects the output of the amplifier 44 to the non-inverting input of the amplifier 42.

It should be explained that the amplifier 44, resistors 39 and 47 and capacitor 48 all form a circuit for eliminating low-frequency noise in the signal that appears at the output of the operational amplifier 42. As previously described, the voltage signal induced in the electrodes 20 and 22 has a specific frequency equal to the generating rate of the vortices. Accordingly, the voltage signal is an alternating sinusoidal signal which is transmitted through the electrical leads 28, 30 and eventually appears at the output of the operational amplifier 42 as a signal 53. This signal is then applied to a comparator 52 operating with hysteresis for producing square wave pulses 54. It should be understood that each square wave pulse corresponds to a sinusoidal pulse of signal 53. Connected to receive the square wave signal 54, a counter 56 operates to count the number of pulses per unit time thereby measuring the frequency of the signal 54. A counting signal produced by the counter 56 is transmitted to a terminal 57 and represents the flow rate of the fluid moving through the pipe 14. Being circuits that are well known, comparator circuit 52 and counter 56 will not be described in detail. However, suitable circuits are described in a book entitled *The Art of Electronics*, written by P. Horowitz and W. Hill (1980).

As can be seen from the above arrangement, the circuitry 32A is simpler than those disclosed in the two patents discussed in the prior art section of this application. The circuit 32A does not require the functions of determining the square, square root and integration of signals in order to produce a signal representative of flow rate. Moreover, since it uses frequency for representing flow rate, the present invention is usable in digital systems.

It should be pointed that the circuit 32A as described above is suitable for fluids that are conductive. However, for non-conductive fluid applications, the use of resistors 58 and 59 for connection to the electrical leads 28 and 30 respectively is preferred. These two resistors connect the leads 28 and 30 to ground 50. Since the current signal carried in electrical leads 28 and 30 may have an unwanted d-c component, the two resistors 58 and 59 permit the shunting of that d-c component to ground in order to avoid any adverse effects on the operation of the circuit 32A.

For the circumstances where a prescribed d-c bias voltage is desirable, such bias voltage (from a voltage source $V_o$) can be applied to the respective electrodes via resistors 61. This arrangement can improve signal quality or protect the electrodes from electrochemial attack.

Figure 3:
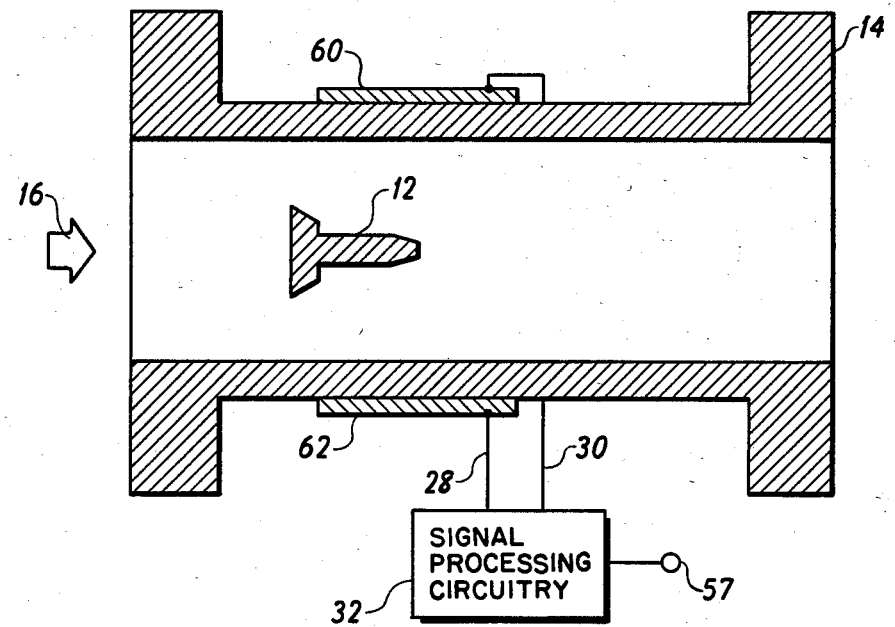
FIG. 3 shows a sectional view of a flowmeter made in accordance with the teachings of the present invention wherein the electrodes are the non-contacting type.

FIG. 3 depicts another embodiment of the present invention wherein the pipe 14 is made of an electrically insulative material and a pair of electrodes 60, 62 are isolated from any contact with the moving fluid. The electrodes are each preferably in the form of a foil attached to the outside of pipe 14. Since this arrangement does not require holes or bores to be formed through the pipe 14, the problems of sealing the electrodes and preventing fluid leakeage are thereby avoided. Moreover, the use of non-contacting electrodes also avoids the problems of electrode corrosion, wear or damage which may result from applications wherein the fluid is highly corrosive or contains abrasive particles. This arrangement also avoids electrode polarization which typically occurs in the case of contacting electrodes.

Figure 4:
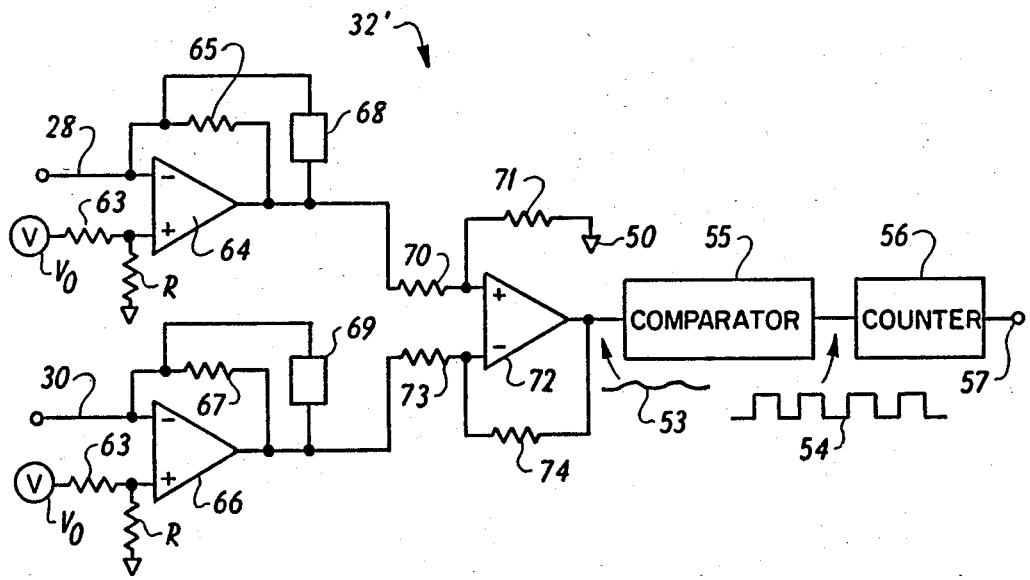
FIG. 4 depicts an electrical schematic of processing circuitry for sensing electrical current signals.

A circuit suitable for use as the signal processing circuitry 32 (shown in FIG. 3) is depicted in FIG. 4 as a circuit 32'. This circuit includes operational amplifiers 64 and 66 which are used as current-sensing amplifiers. The electrical leads 28 and 30 are connected to the respective inverting terminals of these amplifiers. Each of the non-inverting terminals of these amplifiers is held to a fixed potential, which is either at ground 50 via a resistor R or at a desirable bias voltage provided by a voltage source $V_o$ via resistor 63. The respective outputs of these two amplifiers are fed back through the resistors 65 and 67 to the inverting inputs. This arrangement permits these amplifiers to be used as current-sensing amplifiers. Two feedback elements 68 and 69 are connected in parallel arrangement to the resistors 65 and 67 respectively. These two feedback elements serve as low-frequency stabilization circuits which are well-known in the art for removing undesirable low-frequency components in the signal transmitted through the electrical leads 28 and 30.

The respective outputs of the operational amplifiers 64 and 66 are connected to the ends of resistors 70 and 73. The other ends of these resistors are connected respectively to the non-inverting and inverting inputs of an operational amplifier 72. A resistor 71 has one end coupled to the ground 50 and its other end connected to the non-inverting input of the operational amplifier 72. The output of this amplifier is fed back through resistor 74 to the inverting input of the amplifier. As can be seen in FIG. 4, the output of amplifier 72 is a current signal having a sinusoidal wave form 53. The signal is supplied to a comparator 55 which operates in a manner similar to the comparator 52 (shown in FIG. 2) so that the output thereof is a signal having square wave pulses 54. A counter 56 receives the square wave pulses 54 and determines the frequency thereof by counting the number of pulses occurring in a prescribed time period. Appearing at terminal 57, the output signal produced by the counter represents the flow rate of the fluid moving through the pipe.

It should be explained that the electrodes used for sensing the electric field produced by the electrical charges in the vortices are not limited to being mounted to the pipe. Accordingly, with reference to FIG. 5A, an electrode 80 is mounted to a side 82 of the vortex-shedding body 12. A second electrode (not shown) is mounted to a side 84 of the body 12. As can be seen, the sides 82, 84 are disposed downstream from the surface 18 where vortices are generated. Since the body 12 is typically made of metal the electrode 80 is isolated from the side 82 by an insulator 86. A similar insulator is also used for the other electrode mounted to the side 84. A pair of passageways 88, 90 are formed in the body 12 in order to permit the two electrodes to be connected to the input of the signal processing circuitry 32 via electrical leads 92, 94.

Figure 5B:
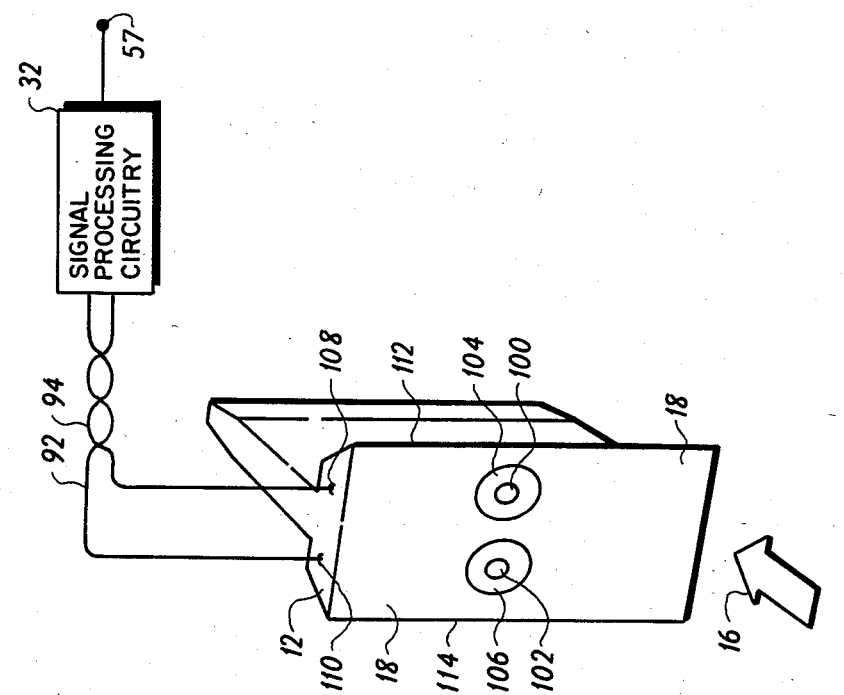
FIG. 5B depicts still another embodiment of the present invention wherein the electrodes are mounted in an upstream face of a vortex-shedding body.
Figure 5A:
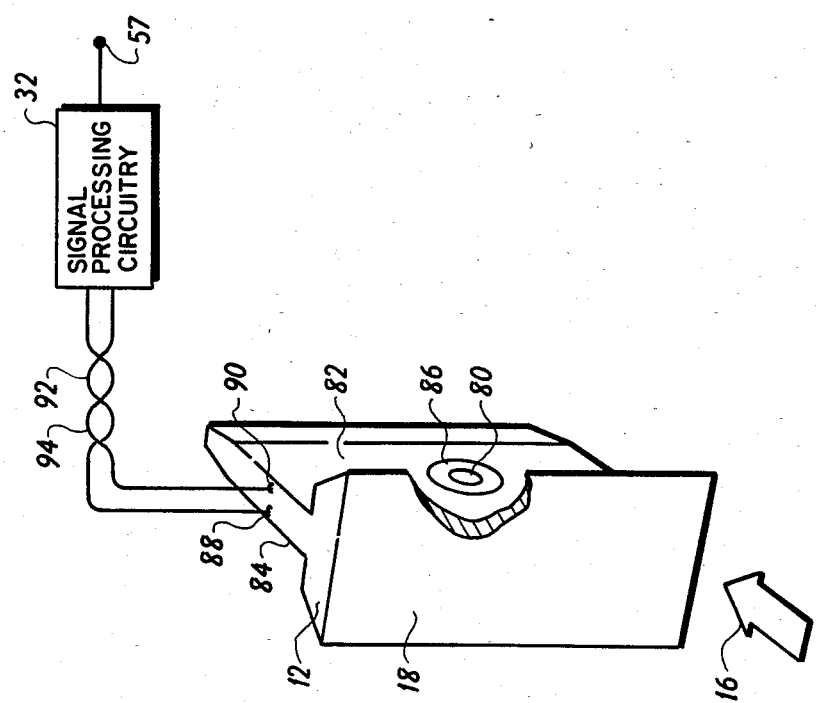
FIG. 5A shows an embodiment of the present invention wherein the electrodes are mounted to a shedding body and disposed downstream from the location where vortices are shed.

In FIG. 5B an alternative arrangement of the electrodes is depicted wherein a pair of electrodes 100, 102 are mounted to the surface 18. Again, if the body 12 is made of an electrically conductive material, a pair of insulators 104, 106 are provided to isolate the electrodes from the body. A pair of passageways 108, 110 are formed in the body 12 for permitting the leads 92, 94 to be connected to the electrodes respectively. It should be explained that these electrodes will detect an electric field because vortices are alternatingly generated from lateral edges 112, 114, so that subflows being shed therefrom move alternatingly (back and forth) across the surface 18. In other words, after a vortex is shed from side 92, the next subflow moves toward side 94 for producing a vortex from that side. The pattern of vortex generation will then repeat thereby producing two trails (streets) of vortices.

Figure 6:
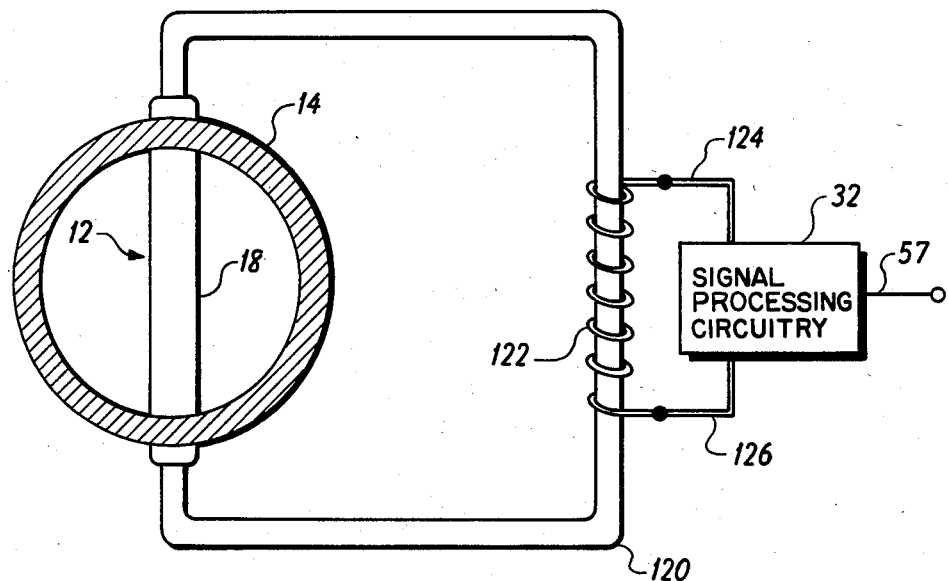
FIG. 6 depicts an embodiment of the present invention wherein the sensor is responsive to the magnetic field generated by the electrical current caused by the movement of the fluid.

FIG. 6 is a sectional front view (that is, the view as seen by looking towards the upstream surface 18 of the body 12) of still another embodiment of the present invention. The body 12 is made of magnetically permeable material and is part of a transformer core 120 which is a low reluctance magnetic loop. The phenomenon which induces the alternating electrical signal in electrodes 20, 22 shown in FIG. 1A also results in a magnetic field which alternates at a frequency equal to the generating frequency of the vortices. The lines of the magnetic field are carried through a transformer core 120 and induce an electrical current in a pickup coil 122. Electrical leads 124 and 126 connected to the pickup coil carry the induced current to the input of the signal processing circuitry 32. The circuitry 32 can be the voltage sensing type as depicted in FIG. 2 or the current sensing type as depicted in FIG. 4.

Figure 7:
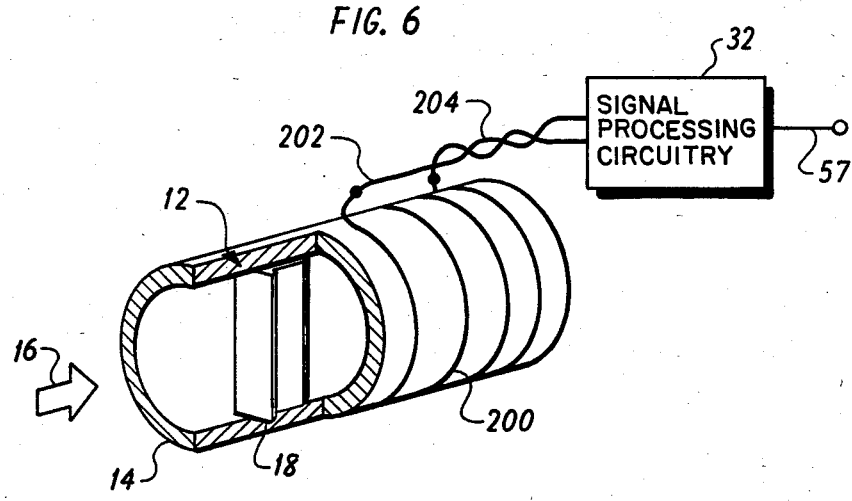
FIG. 7 shows another embodiment of the present invention wherein the sensor includes an electrically conductive coil wrapped around the pipe for sensing the magnetic field produced by the electrical current caused by the movement of the fluid.

FIG. 7 depicts a partial sectional view of another embodiment of the present invention wherein a coil 200 is disposed around the pipe 14 for detecting the alternating magnetic field described above. This arrangement eliminates the transformer core 120 of FIG. 6 and permits the shedding body 12 to be made of materials other than magnetically susceptible materials.

Working embodiments of applicant's invention have been made and tested using various moving fluids. In a one-inch-diameter pipeline having water (a conductive fluid) passing therethrough, a flowmeter of the type depicted in FIG. 1A successfully measured flow rates in the range between 17.5 fps (feet per second) and 1.0 fps. Another larger working embodiment used in a four-inch-diameter pipeline successfully measured water flow rates in the range between 16.5 fps and 0.12 fps. In addition, usable flow rate signals were obtained in applications where the pipe Reynolds number was about 3000.

A flowmeter of the type shown in FIG. 3 was used in a four-inch pipeline having oil (a non-conductive fluid) passing therethrough. Measurements were obtained of flow rates ranging between 11.8 fps and 1.7 fps.

Working embodiments have also been made and used for measuring the flow rates of steam. In a two-inch pipeline having wet steam (a two-phase fluid) passing therethrough, a flowmeter of the type depicted in FIG. 1B measure flow rates in the range between 35.5 cubic feet per minute and 63.8 cubic feet per minute. For the same pipeline having dry steam (a gaseous fluid) this flowmeter measured flow rates in the range between 63.8 cubic feet per minute and 467.4 cubic feet per minute.

Although several preferred embodiments have been described above, it should be understood that they are only given for the purpose of illustration and that modifications will become apparent to those of ordinary skill in the art. For example, the circuit depicted in FIG. 2 can be used with the meter body and electrodes shown in FIG. 3. In addition, the circuit shown in FIG. 4 can be used with the meter body and electrodes depicted in FIGS. 1A and 13.

Figure 8:
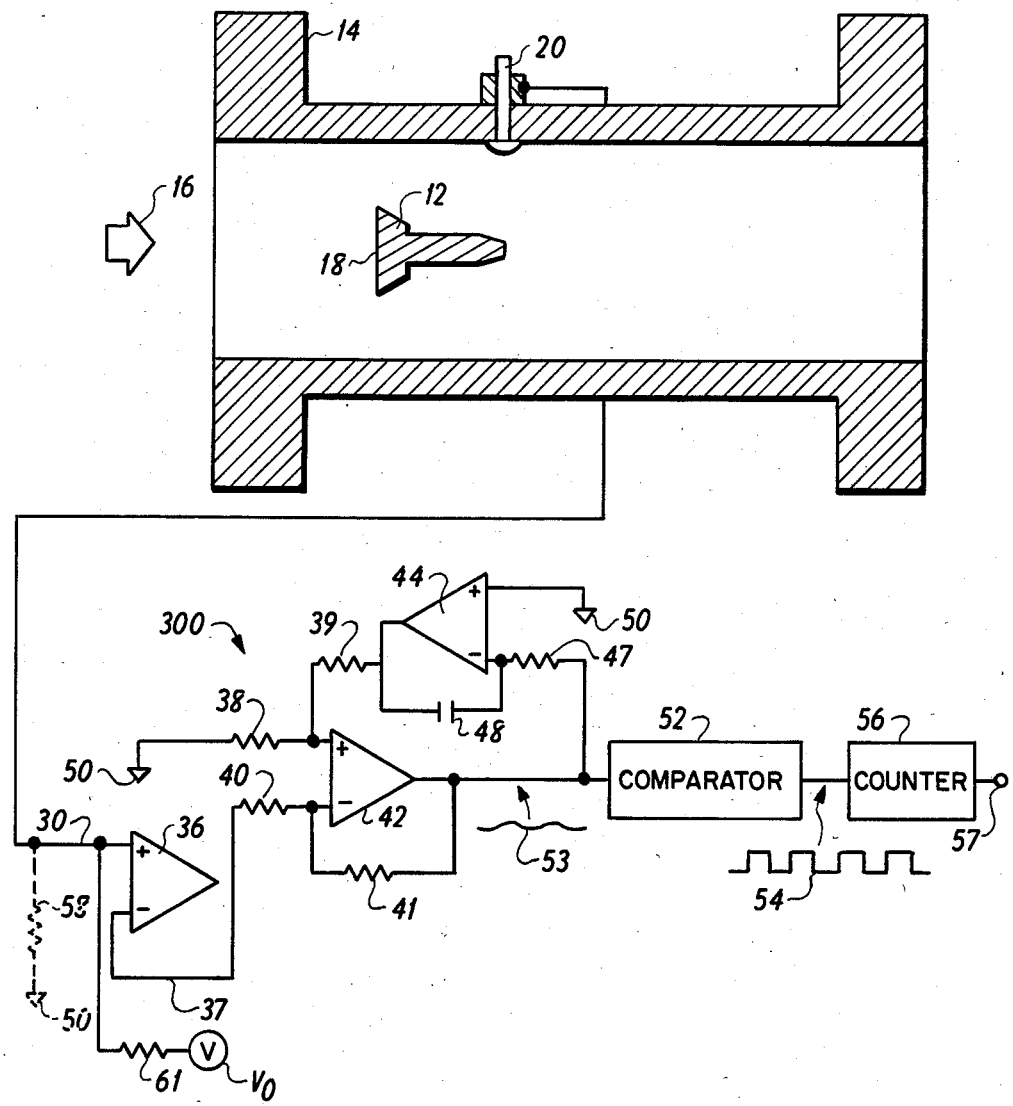
FIG. 8 depicts an embodiment of the present invention wherein a single electrode is used.
Figure 9:
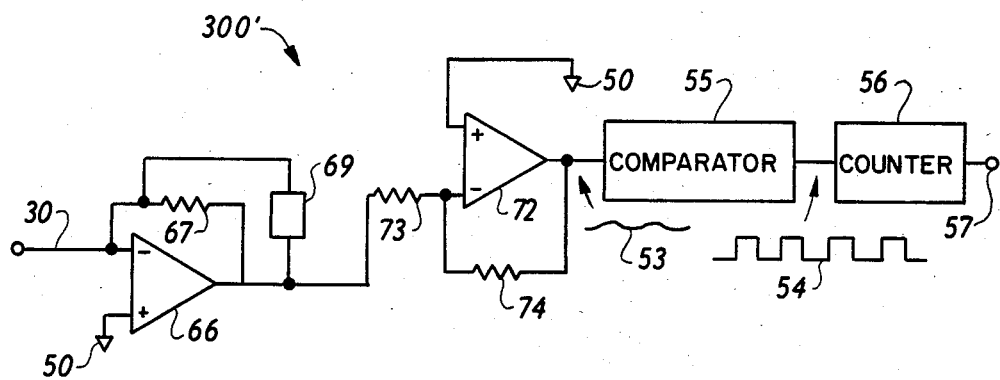
FIG. 9 shows an electrical circuit suitable to replace the circuit depicted in FIG. 8.

Furthermore, a single electrode is usable for detecting the alternating electric signal resulting from the vortex-generating process. One such arrangement is shown in FIG. 8. Electrode 20 is connected to a circuit 300 which is the circuit 32 (shown in FIG. 2) modified for receiving a single-ended signal. FIG. 9 depicts a current-sensing circuit 300' which can be used in place of the circuit 300. As can be seen, the circuit 300' is the circuit 32' (shown in FIG. 4) modified for receiving a single-ended signal.

The present invention is also not limited to vortex-shedding bodies for producing modulated subflows since other structures are suitable, such as an arrangement of vanes for producing swirl-type subflows.

As a result, the invention is not to be limited by the illustrated embodiments but only in accordance with the scope of the accompanying claims.

What is claimed is:

1. In a conduit having a moving fluid passing therethrough, wherein said moving fluid contains naturally occurring electrical charges that flow with said fluid, an apparatus for measuring the flow velocity of the moving fluid comprising:
   modulating means for periodically producing fluidic sub-flows at a generating rate proportional to said flow velocity; and
   sensor means for responding to the electrical charges in each of said fluidic sub-flows and producing therefrom a sensor signal having frequency corresponding to said generating rate of the fluidic sub-flows.

2. The apparatus of claim 1 wherein said modulating means includes a vortex-shedding body disposed in a stream of said moving fluid.

3. The apparatus of claim 1 wherein said sensor includes an electrode responsive to the electric field of said charges in each of the fluidic sub-flows for producing an electrical signal; and means responsive to said electrical signal for producing said sensor signal.

4. The apparatus of claim 3 wherein said electrical signal is a voltage signal.

5. The apparatus of claim 3 wherein said electrical signal is a current signal.

6. The apparatus of claim 3 wherein said electrode is in contact with said moving fluid.

7. The apparatus of claim 3 wherein said electrode is insulated from contacting said moving fluid.

8. The apparatus of claim 3 wherein said modulating means includes a vortex-shedding body disposed in a stream of said moving fluid and said electrode is mounted in an upstream face of said vortex-shedding body.

9. The apparatus of claim 3 wherein said modulating means includes a vortex-shedding body disposed in a stream of said moving fluid and said electrode is mounted in a downstream portion of said vortex-shedding body.

10. The apparatus of claim 3 wherein said conduit is made of electrically conductive material and said electrode is electrically isolated therefrom.

11. The apparatus of claim 3 wherein said conduit is made of an electrically insulative material.

12. The apparatus of claim 1 wherein said moving fluid is non-conductive.

13. The apparatus of claim 1 wherein said moving fluid is electrically conductive.

14. The apparatus of claim 1 wherein said fluid is a liquid.

15. The apparatus of claim 1 wherein said fluid is a gas.

16. The apparatus of claim 1 wherein said fluid has two phases.

17. The apparatus of claim 1 wherein said sensor means includes means responsive to a magnetic field generated by the movement of said electrical charges in each of said fluidic sub-flows.

18. The apparatus of claim 17 wherein said modulating means is disposed in a stream of said moving fluid and is made of magnetically permeable material; and said sensor means includes a transformer core connected to said modulating means and a sensing coil coupled to said core for detecting said magnetic field; said sensing coil being reponsive for producing said sensor signal.

19. The apparatus of claim 17 wherein said sensor means includes an electrically conductive coil wrapped around said conduit for responding to said magnetic field and for generating said sensor signal.

* * * * *